United States Patent Office 3,492,481
Patented Jan. 27, 1970

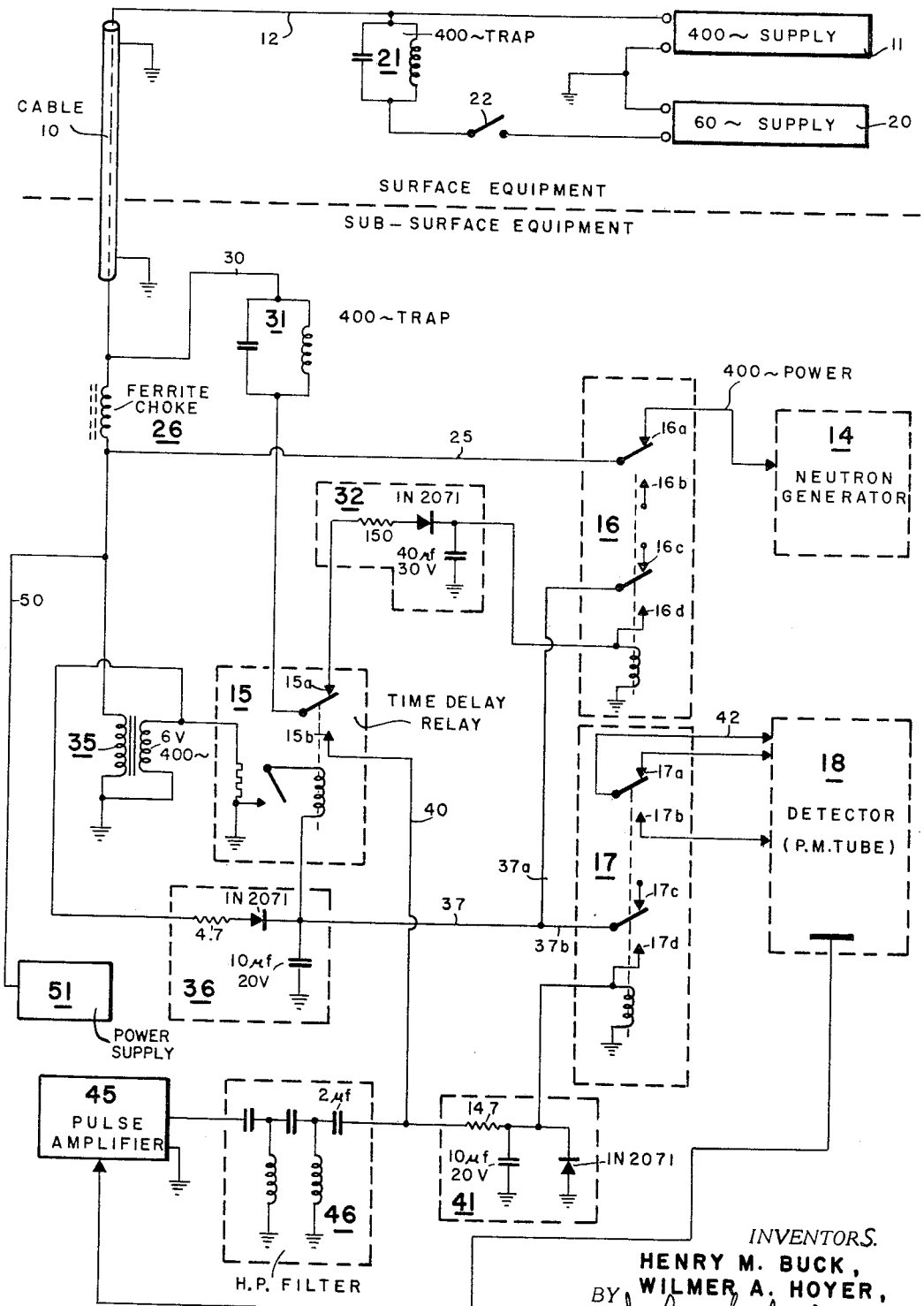

3,492,481
SYSTEM AND METHOD FOR REMOTE CONTROL OF A RADIOACTIVITY LOGGING TOOL
Henry M. Buck and Wilmer A. Hoyer, Houston, Tex., assignors to Esso Production Research Company, a corporation of Delaware
Continuation-in-part of application Ser. No. 301,449, Aug. 12, 1963. This application Oct. 14, 1966, Ser. No. 586,768
Int. Cl. G01t 1/16
U.S. Cl. 250—83.3    16 Claims

ABSTRACT OF THE DISCLOSURE

A surface-operated radioactivity well logging system which permits remote control of various combinations of operating modes of the source and detector of a radioactivity logging tool suspended in a borehole. An A.C. operating power surface source of a selected frequency is transmitted down the cable on which the logging tool is suspended to operate the logging tool. The neutron generator is capable, when supplied with operating power, of bombarding subsurface strata with neutrons and the radiation detector is capable, when supplied with operating power, of operating in a gated mode of operation and in a continuous mode of operation. One subsurface switch has one position in which operating power is supplied to the neutron generator and another position in which the supply of operating power to the neutron generator is cut off. Another subsurface switch has one position in which the radiation detector operates gated and another position in which the radiation detector operates continuously. Control power is transmitted down the cable to control operation of the neutron generator and radiation detector. Such control power, when supplied to the one switch and when supplied to the other switch, changes the positions of these switches. A subsurface time delay switch has one position capable of supplying control power to the one switch and another position capable of supplying control power to the other switch, the time delay switch being energized by the operating power to actuate and change the position of the time delay switch after a selected time delay.

This application is a continuation-in-part of application Ser. No. 301,449, entitled, "System and Method for Remote Control of a Radioactivity Logging Tool," filed Aug. 12, 1963, by Henry M. Buck and Wilmer A Hoyer, now abandoned.

The present invention concerns a surface-operated control system for subsurface radioactivity well logging tools.

An improved technique in radioactivity well logging consists of bombarding earth strata and contained fluids with pulses of high energy neutrons and of making spectroanalyses of the gamma rays produced by the neutron bombardment.

When earth strata are bombarded continuously with fast neutrons, a portion of the gamma radiation produced results from inelastic scattering reactions, and a portion results from neutron capture reactions which take place after the neutrons have lost most of their initial energy. Inelastic scattering interactions occur within a matter of millimicroseconds after production of fast neutrons, whereas the time required for the slowing down of fast neutrons to energy levels necessary for capture reactions requires times of tens or hundreds of microseconds. Thus, a pulsing technique permits discrimination between gamma radiation from inelastic scattering reactions and gamma radiation from neutron capture reactions.

If fast neutrons are produced in pulses of about 5 microseconds duration with an interpulse interval of several hundred microseconds, then a gated gamma ray detecton operative for the duration of the neutron pulse and inoperative during the interpulse interval will detect gamma rays which are predominantly from inelastic scattering reactions. Conversely, if the gated detector is turned off during the neutron pulse interval and on during the interpulse interval, it will detect only those gamma rays from neutron capture reactions. In addition to such mode of operation, it may also be found desirable to operate the detector continuously while the neutron generator is pulsed. Also, it may be desired to operate the detector gated as well as continuously while the neutron generator is turned off in order to detect naturally occurring radiation.

It is a primary object of the present invention to provide an improved radioactivity well logging method and system that will permit remote control of these various combinations of operating modes with the logging tool suspended in a borehole by a conductor-type logging cable.

The invention may be briefly described as comprising method and system for controlling operation of a well logging tool which includes operating power having an A.C. surface source of a selected frequency adapted to be transmitted down said cable to operate the logging tool; a neutron generator capable, when supplied with operating power, of bombarding subsurface strata with neutrons; a radiation detector capable, when supplied with operating power, of operating in a gated mode of operation and in a continuous mode of operation; a first subsurface switch means having one position in which operating power is supplied to the neutron generator and another position in which the supply of operating power to the neutron generator is cut off; a second subsurface switch means having one position in which the radiation detector operates gated and another position in which the radiation detector operates continuously; control power having an A.C. surface source of a different frequency from the operating power frequency adapted, when supplied to the first switch means, to change the position of the first switch means and adapted, when supplied to the second switch means, to change the position of the second switch means; and a subsurface time delay switch means having one position capable of supplying control power to the first switch means and another position capable of supplying control power to the second switch means, said time delay switch means being energized by said operating power to actuate and change the position of said time delay switch means after a selected time delay. In this system, preferably the first switch means is initially in position to supply operating power to the neutron generator and the second switch means is initially in position to operate the radiation detector gated, and the time delay switch means is initially in position to supply control power to the first switch means.

The frequency of the operating A.C. power supplied to the logging tool is preferably 400 cycle. By superimposing a different frequency control power, e.g., 60 cycle, to energize control relays on the 400 cycle operating current at selected times relative to the operation of a subsurface time delay relay switch, which is energized by the 400 cycle power, the four combinations of operation of the neutron generator and detector can be achieved. The signals representative of the detected radiation are in the range of 30 kilocycles and are transmitted to the logging cable when the time delay relay is actuated.

The above object and other objects and advantages of the invention will become more apparent from a detailed description of the invention when taken with the drawing in which the sole figure is a diagrammatic representation of the surface and subsurface circuits of the invention.

As seen in the figure, a single conductor cable 10 is supplied 400 cycle power from a surface source 11 through a conductor 12 to operate a subsurface neutron generator 14 and a time delay relay 15 and to supply power for latching a relay 16 which controls operation of neutron generator 14 and a relay 17 which controls operation of a photomultiplier-type detector 18. Sixty cycle power from a surface source 20 may be supplied to conductor 12 through a 400 cycle trap (capacitor-choke) 21, when a normally open switch 22 is closed, to control the operation of relays 16 and 17.

Downhole (the dashed line designates the division between the surface and subsurface components of the circuit) cable 10 connects to a conductor 25 which carries the 400 cycle power through a ferrite choke 26 to switch contacts 16a, b of relay 16. Neutron generator 14 is "on" when conductor 25 connects with contact 16a as shown in the figure and is "off" when contact 16b connects with conductor 25.

Cable 10 also connects to a conductor 30 which through a 400 cycle trap 31, consisting of a capacitor and choke designed to block passage of the 400 cycle operating power and pass the 60 cycle control power, and through contact 15a of time delay relay 15 (the connection for the contacts when relay 15 is not energized) and through a rectifier 32, consisting of a resistor-diode-capacitor network, supplies 60 cycle power to energize relay 16 and switch conductor 25 from contact 16a to contact 16b and thereby turn off neutron generator 14. Also, when relay 16 is energized, conductor 37a is moved from contact 16c to contact 16d.

Time delay relay 15 is designed to switch the 60 cycle control power in conductor 30 from contact 15a to contact 15b two minutes after being energized. Power for energizing relay 15 is taken from the 400 cycle power conductor 25, and its voltage is reduced by a transformer 35. The reduced voltage 400 cycle power is also rectified by the resistor-diode-capacitor network 36 and transmitted through conductors 37, 37a and 37b to latch the contacts of relays 16 and 17 after these relays have been energized.

After relay 15 has been energized for two minutes and conductor 30 switches to contact 15b, 60 cycle power may be transmitted through a conductor 40 and a rectifier network 41, consisting again of a resistor-diode-capacitor circuit, to control relay 17 to energize it and move a conductor 42 from a contact 17a to a contact 17b. As explained in greater detail below, this move changes the operation of detector 18 from gated to continuous operation. Also, when relay 17 is energized, conductor 37b is moved from contact 17c to contact 17d.

In neutron generator 14 a controllable number of deuterium ions is supplied through a region of high electric field which accelerates the ions to 100 kv. energy onto a tritium-containing target from which neutrons are generated. The neutrons are generated in pulses, preferably of about four microseconds duration. A preferred neutron generator for use with the present invention is described and claimed in U.S. patent application Ser. No. 241,444, entitled, "Pulsed Neutron Source," filed Nov. 30, 1962, by W. A. Hoyer and R. C. Rumble.

The gamma ray detector 18 consists of a photomultiplier tube and a scintillation crystal combination. Gamma rays detected by the scintillation crystal produce scintillations whose intensities are proportional to the energies of the incident gamma rays. The photomultiplier tube produces a voltage pulse whose amplitude is proportional to the intensity of scintillation. Hence, the crystal-photomultiplier detector produces a voltage pulse whose height is proportional to the energy of the incident gamma rays. A preferred detector for use with the invention is described in U.S. Patent No. 2,951,941, issued Sept. 6, 1960, to H. R. Brannon, Jr., entitled, "Method and Apparatus for Pulsing a Scintillation Detector." When it is desired to gate the photomultiplier tube to observe radiations only during a selected time interval, the photomultiplier is made inoperative by biasing one of the its dynodes almost to cut-off and to restore operation a positive gate is applied to this dynode as described in the Brannon, Jr., patent. A coincident negative gate may be applied to another dynode for balancing purposes, and this dynode is biased slightly positive so that the negative pulse restores normal operating voltage. A circuit of this latter type is shown and described in U.S. Patent No. 2,911,535, issued to N.L. Muench, Nov. 11, 1959, entitled, "Method and Apparatus for Pulsing a Scintillation Detector." The detector operates normally gated, and the connection between conductor 42 and contact 17a effects such operation. When continuous operation is desired, the bias on the gated dynode is removed, and normal operating voltage is applied to the dynodes of the photomultiplier. It is this operation that occurs when conductor 42 is switched from contact 17a to contact 17b in relay 17.

Thus, in this system the following combinations of operating modes for the neutron generator 14 and the detector 18 are possible.

| Detector: | Neutron generator |
|---|---|
| (I) Gated | On |
| (II) Continuous | On |
| (III) Gated | Off |
| (IV) Continuous | Off |

These operations are achieved as follows:

(I) DETECTOR GATED—NEUTRON GENERATOR ON

When the 400 cycle operating power is turned on, both neutron generator 14 and detector 18 operate pulsed and gated, respectively. After two minutes, time delay relay 15 actuates and switches conductor 30 from contact 15a to contact 15b. However, since switch 22 remains open, no 60 cycle control power is supplied to relays 16 and 17. They remain in their normal positions, and the neutron generator and detector continue to operate pulsed and gated.

(II) DETECTOR CONTINUOUS—NEUTRON GENERATOR ON

To operate detector 18 continuously with the neutron generator 14 remaining "on," switch 22 is momentarily closed after time delay relay 15 has shifted conductor 30 to contact 15b which sends 60 cycle power to relay 17 to energize it and shift conductor 42 from contact 17a to contact 17b. The 400 cycle power transmitted to relay 17 through conductors 37 and 37b and contact 17d latches conductor 42 to contact 17b, and the detector operates continuously while the neutron generator operates pulsed.

(III) DETECTOR GATED—NEUTRON GENERATOR OFF

To operate the detector gated with the neutron generator "off," switch 22 is momentarily closed before time delay relay 15 actuates to switch conductor 30 to contact 15b which causes 60 cycle power to be transmitted to relay 16 through rectifier 32 and energizes it to switch conductor 25 to contact 16b and thereby cut off the 400 cycle operating power going to neutron generator 14. However, 400 cycle power is supplied to relay 16 through conductors 37 and 37a and contact 16d to latch conductor 25 to contact 16b.

(IV) DETECTOR CONTINUOUS—NEUTRON GENERATOR OFF

To operate with the detector continuous and the neutron generator off, a sequence combining (II) and (III) is used. Thus, switch 22 is momentarily closed before and after actuation of relay 15. The operation in each instance is the same as previously described.

Operating power is also supplied to detector 18 as indicated by arrowed line 50 in the figure which connects cable 10 (and the 400 cycle power supply) to a power supply 51 for supplying power to pulse amplifier 45, detector 18 and associated timing and gating networks not shown.

The photomultiplier signal pulses from detector 18 are amplified in a linear amplifier 45. The source impedance of this amplifier is high, and the output impedance is low to obtain a proper match to the cable. The signal pulse is coupled into cable 10 through a high pass filter 46 to provide isolation between the amplifier and the power circuits. The signal pulse is transmitted through conductor 40, relay 15 (when conductor 30 is connected to contact 15b) and conductor 30 to cable 10.

The constants given in the drawing are illustrative of values that may be used.

Although electromechanical relays or switching means have been described in illustrating means for turning the neutron generator on or off and for switching the detector from continuous to gated operations or vice versa and for controlling such operations of the neutron generator and detector as well as for transmission to the surface of signals representative of detected radiation, other analogous switching means, such as transistors or tubes, could be used instead. Also, although the conductor cable has been described as a single or monoconductor cable for purposes of illustration, a multiple conductor cable could be employed instead. When a multiple conductor cable is used, the operating power and the control power and the signals representative of detected radiation may be imposed on separate conductors or any two or all may be transmitted over only one of the multiple conductors. Although it is preferred to employ different control and operating power frequencies, a multiple conductor cable would permit control and operating power to be the same frequency. The arrangement of the switches for turning the neutrol generator "on" and "off" and for switching the detector from gated to continuous operation as described herein is a preferred arrangement; however, other arrangements will be readily apparent. For example, the "normal" positions of switches 16 and 17 shown in the figure may be changed so that until actuated the neutron generator is off and the detector operates continuously. Other modifications may be made without departing from the spirit and scope of the invention.

Having fully described the nature, operation, components and objects of our invention, we claim:

1. A system for controlling operation of a radioactivity logging tool adapted to be suspended by a conductor cable in a borehole comprising:
   a surface source of A.C. operating power of a selected frequency adapted to be transmitted down said cable to operate said tool;
   a surface source of A.C. power of a different frequency from said operating power frequency adapted to be transmitted down said cable and provided with means at the surface for controlling transmission of control power;
   a neutron generator capable, when supplied with operating power, of bombarding surface strata with neutrons;
   a radiation detector adapted to provide signals representative of detected radiation and capable, when supplied with operating power of operating in a gated mode of operation and in a continuous mode of operation;
   a first subsurface switch means having one position in which operating power is supplied to said neutron generator and another position in which the supply of operating power to said neutron generator is cut off;
   a second subsurface switch means having one position in which said radiation detector operates gated and another position in which said radiation detector operates continuously;
   said control power being adapted, when supplied to said first switch means, to change the position of said first switch means and adapted, when supplied to said second switch means, to change the position of said second switch means;
   a subsurface time delay switch means having one position capable of supplying control power to said first switch means and another position capable of supplying control power to said second switch means, said time delay switch means being energized by said operating power to actuate and change the position of said time delay switch means after a selected time delay; and
   a subsurface circuit including means to block passage of said operating power to said first and second switch means;
   means for rectifying said control power transmitted to said first and second switch means;
   first latching means energized by operating power adapted to latch said first switch means in its changed position;
   second latching means energized by operating power adapted to latch said second switch means in its changed position;
   means adapted to rectify said operating power supplied to said first and second latching means; and
   means for amplifying and filtering signals representative of detected radiation.

2. A system as recited in claim 1 in which said conductor cable is a single conductor cable.

3. A system as recited in claim 1 in which said conductor cable is a multiple conductor cable.

4. A method for controlling the operation if a radioactivity logging tool suspended by a conductor cable in a borehole, said well logging tool including a neutron generator capable, when operated, of bombarding subsurface strata with neutrons generated in pulses; a radiation detector capable, when operated, of a gated mode of operation and a continuous mode of operation; a first switch means having one position in which operating power is supplied to said neutron generator and another position in which said supply of operating power to said neutron generator is cut off; a second switch means having one position in which said radiation detector operates gated and another position in which said radiation detector operates continuously; and a time delay switch means having one position in which control power is supplied to said first switch means and another position in which control power is supplied to said second switch means, said time delay switch means being energized by said operating power to actuate and change the position of said time delay switch means after a selected time delay following energization thereof, comprising the steps of:
   transmitting operating power of a selected frequency from the earth's surface down said cable adapted to operate said radioactivity logging tool; and
   transmitting signal pulses representative of detected radiation of a frequency different from the frequencies of said operating power and said control power from said detector up said cable to the earth's surface only after the position of said time delay switch means has been changed after a selected time delay following energization thereof.

5. A method for controlling the operation of a radioactivity logging tool suspended by a conductor cable in a borehole, said well logging tool including a neutron generator capable, when operated, of bombarding subsurface strata with neutrons generated in pulses; a radiation detector capable, when operated, of a gated mode of operation and a continuous mode of operation; a first switch means having one position in which operating power is supplied to said neutron generator and another position in which said supply of operating power to said neutron generator is cut off; a second switch means having one position in which said radiation detector operates gated and another position in which said radiation detector operates continuously; and a time delay switch means having one position in which control power is supplied to said first switch means and another position in which control power is supplied to said second switch means, said time delay switch means being energized by said operating power to actuate and change the position of said time delay switch means after a selected time delay following energization thereof, comprising the steps of:
- transmitting operating power of a selected frequency from the earth's surface down said cable adapted to operate said radioactivity logging tool;
- superimposing control power of a frequency different from said operating power frequency on said operating power frequency prior to actuation of said time delay switch means to cause a change in the position of one of said first and second switch means; and
- transmitting signal pulses representative of detected radiation of a frequency different from the frequencies of said operating power and said control power from said detector up said cable to the earth's surface.

6. A method as recited in claim 5 in which said control power changes the position of said first switch means to cut off the supply of operating power to said neutron generator.

7. A method for controlling the operation of a radioactivity logging tool suspended by a conductor cable in a borehole, said well logging tool including a neutron generator capable, when operated, of bombarding subsurface strata with neutrons generated in pulses; a radiation detector capable, when operated, of a gated mode of operation and a continuous mode of operation; a first switch means having one position in which operating power is supplied to said neutron generator and another position in which said supply of operating power to said neutron generator is cut off; a second switch means having one position in which said radiation detector operates gated and another position in which said radiation detector operates continuously; and a time delay switch means having one position in which control power is supplied to said first switch means and another position in which control power is supplied to said second switch means, said time delay switch means being energized by said operating power to actuate and change the position of said time delay switch means after a selected time delay following energization thereof, comprising the steps of:
- transmitting operating power of a selected frequency from the earth's surface down said cable adapted to operate said radioactivity logging tool;
- superimposing control power of a frequency different from said operating power frequency on said operating power frequency following actuation of said time delay switch means to cause a change in the position of one of said first and second switch means; and
- transmitting signal pulses representative of the detected radiation of a frequency different from the frequencies of said operating power and said control power from said detector up said cable to the earth's surface.

8. A method as recited in claim 7 in which said control power changes the position of said second switch means to change operation of said radiation detector from gated to continuous operation.

9. A method for controlling the operation of a radioactivity logging tool suspended by a conductor cable in a borehole, said well logging tool including a neutron generator capable, when operated, of bombarding subsurface strata with neutrons generated in pulses; a radiation detector capable, when operated, of a gated mode of operation and a continuous mode of operation; a first switch means having one position in which operating power is supplied to said neutron generator and another position in which said supply of operating power to said neutron generator is cut off; a second switch means having one position in which said radiation detector operates gated and another position in which said radiation detector operates continuously; and a time delay switch means having one position in which control power is supplied to said first switch means and another position in which control power is supplied to said second switch means, said time delay switch means being energized by said operating power to actuate and change the position of said time delay switch means after a selected time delay following energization thereof, comprising the steps of:
- transmitting operating power of a selected frequency from the earth's surface down said cable adapted to operate said radioactivity logging tool;
- superimposing control power of a frequency different from said operating power frequency on said operating power frequency prior to actuation of said time delay switch means to cause a change in the position of one of said first and second switch means;
- superimposing said control power of a frequency different from said operating power frequency on said operating power frequency after actuation of said time delay switch means to cause a change in the position of the other of said first and second switch means; and
- transmitting signal pulses representative of detected radiation of a frequency different from the frequencies of said operating power and said control power from said detector up said cable to the earth's surface.

10. A method as recited in claim 9 in which superimposing control power prior to actuation of said time delay switch means changes the position of said first switch means to cut off the supply of operating power to said neutron generator and superimposing control power following actuation of said time delay switch means changes the position of said second switch means to change operation of said radiation detector from gated to continuous operation.

11. A method for controlling the operation of a radioactivity logging tool suspended by a conductor cable in a borehole, said well logging tool including a neutron generator capable, when operated, of bombarding subsurface strata with neutrons generated in pulses; a radiation detector capable, when operated, of a grated mode of operation and a continuous mode of operation; a first switch means having one position in which operating power is supplied to said neutron generator and another position in which said supply of operating power to said neutron generator is cut off; a second switch means having one position in which said radiation detector operates gated and another position in which said radiation detector operates continuously; and a time delay switch means having one position in which control power is supplied to said first switch means and another position in which control power is supplied to said second switch means, said time delay switch means being energized by said operating power to actuate and change the position of said time delay switch means after a selected time delay following energization thereof, comprising the steps of:
- transmitting operating power of a selected frequency from the earth's surface down said cable to operate said radioactivity logging tool; and
- transmitting control power from the earth's surface down said cable at a selected time according to the position of said time delay switch means to cause a change in the position of at least one of said first and second switch means.

12. A method for controlling the operation of a radioactivity logging tool suspended by a conductor cable in a borehole, said well logging tool including a neutron generator capable, when operated, of bombarding surbsurface strata with neutrons generated in pulses; a radiation detector capable, when operated, of a gated mode of operation and a continuous mode of operation; a first switch means having one position in which operating power is supplied to said neutron generator and another position in which said supply of operating power to said neutron generator is cut off; a second switch means having one position in which said radiation detector operates gated and another position in which said radiation detector operates continuously; and a time delay switch means having one position in which control power is supplied to said first switch means and another position in which control power is supplied to said second switch means, said time delay switch means being energized by said operating power to actuate and change the position of said time delay switch means after a selected time delay following energization thereof, comprising the steps of:

transmitting operating power from the earth's surface down said cable to operate said radioactivity logging tool; and transmitting control power from the earth's surface down said cable at a selected time or times according to the position of said time delay switch means to cause a change in the position of at least one of said first and second switch means.

13. A method as recited in claim 12 in which said control power is transmitted prior to actuation of said time delay switch means.

14. A method as recited in claim 12 in which said control power is transmitted following actuation of said time delay switch means.

15. A method as recited in claim 12 in which said control power is transmitted both prior to actuation of said time delay switch means and following actuation of said time delay switch means.

16. A method as recited in claim 12 including transmitting signal pulses representative of the detected radiation from said detector up said cable to the earth's surface.

References Cited

UNITED STATES PATENTS

| | | | |
|---|---|---|---|
| 3,164,720 | 1/1965 | Armistead | 250—83.3 |
| 3,184,598 | 5/1965 | Tittle | 250—83.3 |

ARCHIE R. BORCHELT, Primary Examiner

U.S. Cl. X.R.

250—836